United States Patent
Rahmani et al.

(10) Patent No.: US 12,007,112 B2
(45) Date of Patent: Jun. 11, 2024

(54) PELLET SMOKER

(71) Applicant: W.C. BRADLEY CO., Columbus, GA (US)

(72) Inventors: Ramin Khosravi Rahmani, Columbus, GA (US); Anthony Hamilton, Hamilton, GA (US); Bruce Roberts, Phenix City, AL (US); Mallik Ahmed, Columbus, GA (US); Sleiman Abdallah, Columbus, GA (US); Brad Gillespie, Midland, GA (US); Dan Corso, Columbus, GA (US)

(73) Assignee: W.C. Bradley Co., Columbus, GA (US)

( * ) Notice: Subject to any disclaimer, the term of this patent is extended or adjusted under 35 U.S.C. 154(b) by 0 days.

(21) Appl. No.: 17/900,528

(22) Filed: Aug. 31, 2022

(65) Prior Publication Data

US 2022/0412549 A1    Dec. 29, 2022

Related U.S. Application Data

(63) Continuation of application No. 16/653,517, filed on Oct. 15, 2019, now Pat. No. 11,435,074.

(51) Int. Cl.
*F23B 30/00* (2006.01)
*A23B 4/052* (2006.01)
(Continued)

(52) U.S. Cl.
CPC .............. *F23B 1/38* (2013.01); *A23B 4/052* (2013.01); *A47J 37/0704* (2013.01);
(Continued)

(58) Field of Classification Search
CPC ...... F23B 1/38; F23B 7/002; F23B 2700/013; F23B 2700/037; A23B 4/052;
(Continued)

(56) References Cited

U.S. PATENT DOCUMENTS 4,909,235 A * 3/1990 Boetcker ............. A47J 37/0704
                                                       126/25 C
6,293,271 B1 * 9/2001 Barbour ............. A47J 37/0786
                                                       126/41 R
(Continued)

FOREIGN PATENT DOCUMENTS

| CN | 105263378 | 1/2016 |
| CN | 206560356 U | 10/2017 |
| WO | 2018111155 | 6/2018 |

OTHER PUBLICATIONS

National Intellectual Property Administration, P.R. China; Search Report; Application No. 20198008261X; dated Jul. 10, 2023; W.C. Bradley Co.

*Primary Examiner* — David J Laux
(74) *Attorney, Agent, or Firm* — GableGotwals; David G. Woodral

(57) ABSTRACT

A floor and an upright sidewall formed from two vertically coaxial components, each component having a floor baffle with a plurality of floor openings defined therein, each floor retained within a respective upright sidewall with a plurality of sidewall openings defined therein. The floor openings and the sidewall openings cooperate between the two coaxial components such that flow of gases through the floor and upright sidewall of the baffle structure is controlled by rotation of the two vertically coaxial components relative to one another.

4 Claims, 4 Drawing Sheets

(51) Int. Cl.
*A47J 37/07* (2006.01)
*F24B 1/02* (2006.01)

(52) U.S. Cl.
CPC .............. *F23B 7/002* (2013.01); *F24B 1/024* (2013.01); *F23B 2700/013* (2013.01); *F23B 2700/037* (2013.01)

(58) Field of Classification Search
CPC ..... A47J 37/0704; F24B 1/024; F24B 1/1895; F24B 1/207
See application file for complete search history.

(56) References Cited

U.S. PATENT DOCUMENTS

| | | | |
|---|---|---|---|
| 7,984,709 B1* | 7/2011 | Byrnes | A47J 37/0704 |
| | | | 126/250 |
| 2004/0025714 A1 | 2/2004 | Neal et al. | |
| 2008/0230044 A1* | 9/2008 | Warner | F24B 1/022 |
| | | | 126/25 B |
| 2014/0377431 A1* | 12/2014 | Kazerouni | A47J 37/0786 |
| | | | 426/523 |
| 2017/0102149 A1* | 4/2017 | Nadal | A47J 37/0704 |
| 2017/0198917 A1* | 7/2017 | Gillespie | F24B 1/026 |

* cited by examiner

PELLET SMOKER

CROSS-REFERENCE TO RELATED CASES

This application claims the benefit of U.S. provisional patent application Ser. No. 62/745,050, filed on Oct. 12, 2018, and incorporates such provisional application by reference into this disclosure as if fully set out at this point. This application is a continuation of U.S. patent application Ser. No. 16/653,517 entitled PELLET SMOKER filed on Oct. 15, 2019, the contents of which are hereby incorporated by reference.

FIELD OF THE INVENTION

This disclosure relates to solid fuel cooking in general and, more particularly, to systems for cooking using solid fuel pellets.

BACKGROUND OF THE INVENTION

Prior outdoor wood pellet fired cooking and smoking appliances are described, among other places, in U.S. Pat. Nos. 4,823,684 and 5,251,607, both to Joseph Traeger, et al. Some improvements and variations of these products may have been made but their essential principal of operation remains the same. An electrically driven auger transports small compressed wood pellets from an exterior hopper to a combustion chamber or firepot (typically cylindrical and/or having an open top). The combustion chamber or firepot is supplied with combustion air pressurized and driven by an exterior fan through ductwork to an area surrounding the firepot and then though holes in the exterior of the firepot feeding air into the combustion space. The hot gas from the firepot is conveyed to a cooking grate placed above the firepot.

Wood pellet smoking and cooking appliances may be used to cook meat, often in large pieces such as roasts or briskets. Such cuts of meat may require sustained periods of cooking (on the order of hours) at low to moderate temperatures such as 200° F. to 400° F. Also, cool smoking at temperatures lower than 200° F. can be practiced. Since there is a desire to accommodate a significant quantity of meat, the size of the cooking area may be between 400 and 500 square inches. To provide even cooking across the cooking grate, a set of baffles may be placed above the firepot. These baffles may be optimized to produce a relatively low thermal intensity in terms of energy output per unit of area.

Using appliances having a relatively large cooking area (common in the marketplace) it may become very difficult to obtain such higher thermal intensities as may be desired for grilling over short periods of time (on the order of minutes) simply by upsizing, or by more rapidly running the auger feed from the pellet hopper. Such difficulty is, first of all, based on the problem of evenly distributing heat from a concentrated heat source (e.g., a single firepot), to a large, typically rectangular, cooking area without absorbing or losing too much heat in the baffle structure necessary to accomplish this. A second difficulty, from a commercial point of view, is the expense of scaling up the auger drive and combustion air fan delivery and firepot structure. Also, a large-scale, high thermal intensity, fire systems struggle delivering the cool smoking feature in currently available designs. Thus, it has remained the case that most such pellet appliances described do not perform well for grilling, particularly in providing high cooking grate temperatures to create searing action on the exterior of the food.

What is needed is a device and system for addressing the above, and related, issues.

SUMMARY OF THE INVENTION

The invention of the present disclosure, in one aspect thereof, comprises a dual component baffle structure for use in a smoker. The structure has a floor and an upright sidewall formed from two vertically coaxial components, each component having a floor baffle with a plurality of floor openings defined therein, each floor retained within a respective upright sidewall with a plurality of sidewall openings defined therein. The floor openings and the sidewall openings cooperate between the two coaxial components such that flow of gases through the floor and upright sidewall of the baffle structure is controlled by axial rotation of the two vertically coaxial components relative to one another.

The baffle structure may have at least one configuration where gases are admitted through the floor openings and blocked by the sidewall openings, and at least one configuration where gases are blocked by the floor openings and admitted through the sidewall openings. The baffle structure may have at least one configuration where gases are admitted through the floor openings and through the sidewall openings simultaneously. In some embodiments, at least one of the floor and the upright sidewall have a partially open configuration.

The baffle structure may further comprise a set of legs or other support structure affixed to a lower one of the two coaxial components for elevating the baffle structure above a firepot in a firebox. The baffle structure may further comprise a mid baffle affixed vertically along a medial portion of the sidewall of an upper one of the two coaxial components.

The sidewalls of each of the two vertically coaxial components may comprise a circumferential portion having no sidewall openings defined therein. The sidewall openings on each of the two vertically coaxial components may comprise a checkerboard pattern in the respective sidewall.

The invention of the present disclosure, in another aspect thereof, comprises a cooking appliance with a cooking grate supported over a fire box having a firepot contained therein that burns solid pelletized fuel fed from an auger running from outside the firebox. The appliance includes a baffle structure arranged above the firepot and having an upper component nested coaxially within lower component with the upper and lower components rotatable with respect to one another. The upper component has a floor defining a first plurality of floor openings therein, the first plurality of openings being arranged in a first predetermined pattern on the floor of the upper component. The lower component has a floor defining a second plurality of floor openings therein, the second plurality of openings being arranged in a second predetermined pattern on the floor of the lower component. The upper component floor rests in contact with the lower component floor and the first and second predetermined patterns of the respective floor openings defined in the respective floors are arranged such that overlap of the first and second plurality of openings may be selected or deselected by rotation of the upper component relative to the lower component.

In some embodiments, the upper and lower components further comprise upper and lower upright sidewalls, respectively, joining the respective floors. The upper and lower upright sidewalls may define a plurality of upper sidewall openings and a plurality of lower sidewall openings respectively. The upper upright sidewall openings and the lower upright sidewall openings may have a configuration such that overlap between the first plurality of upright sidewall openings and the second plurality of upright sidewall openings may be selected or deselected by rotation of the upper component relative to the lower component.

In some cases the overlap between the first and second plurality of floor openings is selected when the overlap in the between the first and second plurality of upright sidewall openings is not selected. In some cases the overlap between the first and second plurality of floor openings is not selected when the overlap in the between the first and second plurality of upright sidewall openings is selected.

The cooking appliance may include herein an upper component further comprising a mid baffle spaced apart from the upper component floor. The mid baffle may be removable to allow more easier access to the remaining parts of the baffle structure. The cooking appliance may include a set of legs or other structure supporting the baffle structure over the firepot. The baffle structure may interpose the firepot and the cooking grate and define a high temperature zone on the cooking grate that is active when the overlap between the first and second plurality of floor openings is selected.

The invention of the present disclosure, in another aspect thereof, comprises a cooking grill having a firebox with a heat source therein and a cooking grate suspended over the heat source. The cooking grill has a baffle having a floor and a sidewall formed from two nested components that are axially rotatable with respect to one another, rotation of the two nested components opening and closing a first plurality of openings in the floor and a second plurality of openings in the sidewall. The nested components are rotated to close the first plurality of openings when the second plurality of openings is open, and vice versa. The baffle interposes the cooking grate and the heat source to concentrate heat on a high temperature zone of the cooking grate when the first plurality of openings are open, and disperses heat away from the heat source to an area on the cooking grate larger than the high temperature zone when the first plurality of openings is closed.

The baffle may contain a mid baffle, which may be removable, spaced apart from the floor and supported by the sidewall. The heat source may be a solid pellet fuel burning firepot having with forced combustion air from outside the firebox.

DETAILED DESCRIPTION OF THE PREFERRED EMBODIMENTS

Figure 1:
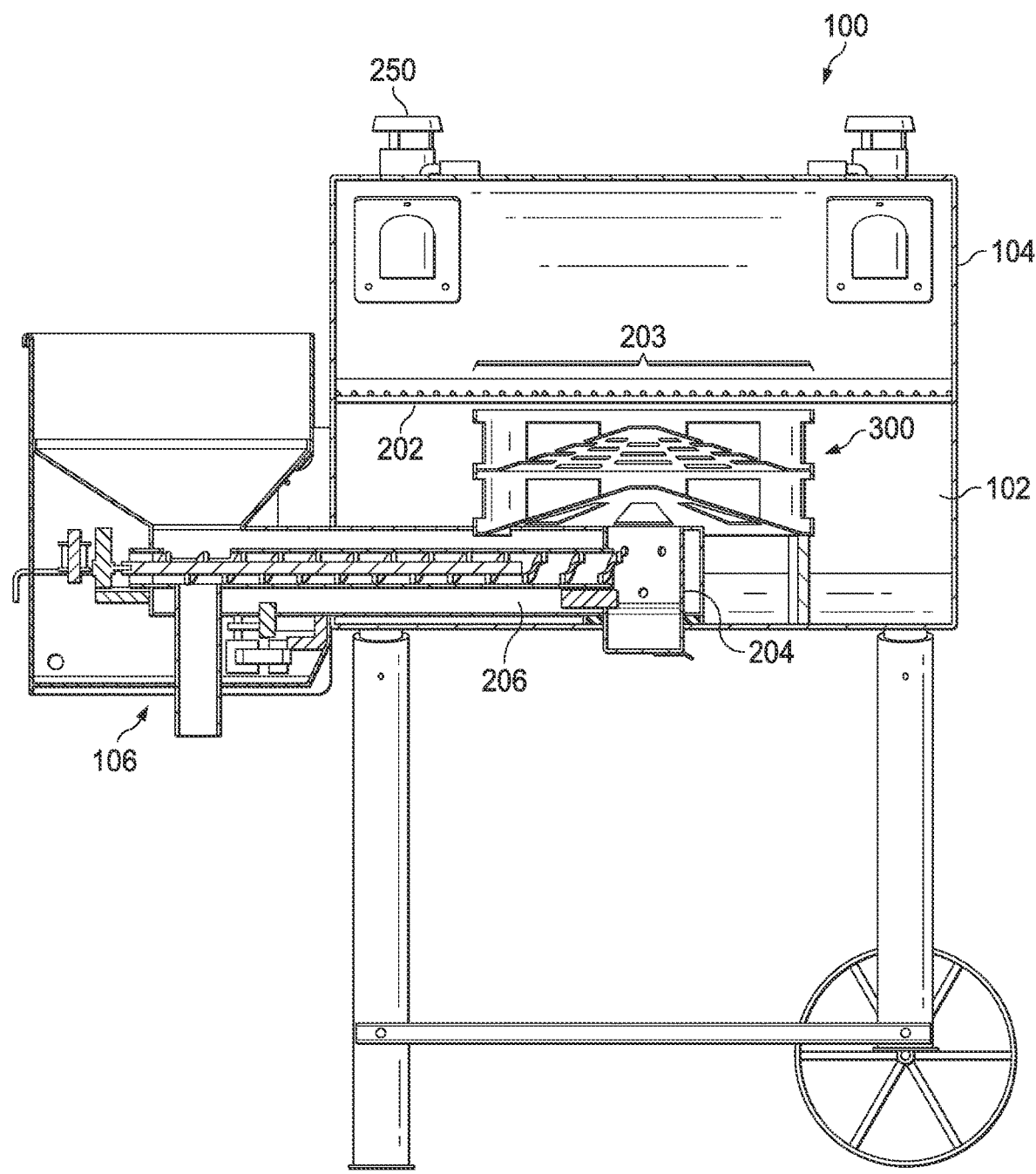
FIG. 1 is a cutaway view of a smoker according to aspects of the present disclosure.

Referring now to FIG. 1, a cutaway view of a smoker according to aspects of the present disclosure is shown. The smoker 100 may comprise a firebox 102 with an openable lid 104. The lid 104 may be hinged and have a handle for opening and closing as well as one or more flues or vents 250. A pellet feeding hopper system 106 can be seen where a user feeds fuel pellets for auguring into a firepot 204 for combustion. A vent duct 206 may provide combustion air to the firepot 204, possibly under positive pressure. Both fuel and air supply may be user controllable for the amount of heat and/or smoke produced.

A cooking grate 202 may be provided within the firebox 102 on which food items rest while being cooked. A baffle structure 300 interposes the firepot 204 and the cooking grate 202 as described herein. The baffle structure 300 can be used to control the delivery of heat and combustion products to provide a diffuse delivery throughout the smoker 100 and cooking grate 202. It may also be configured to concentrate heat and combustion product delivery to a smaller, and therefore higher temperature area, or high temperature cooking zone 203.

Figure 2:
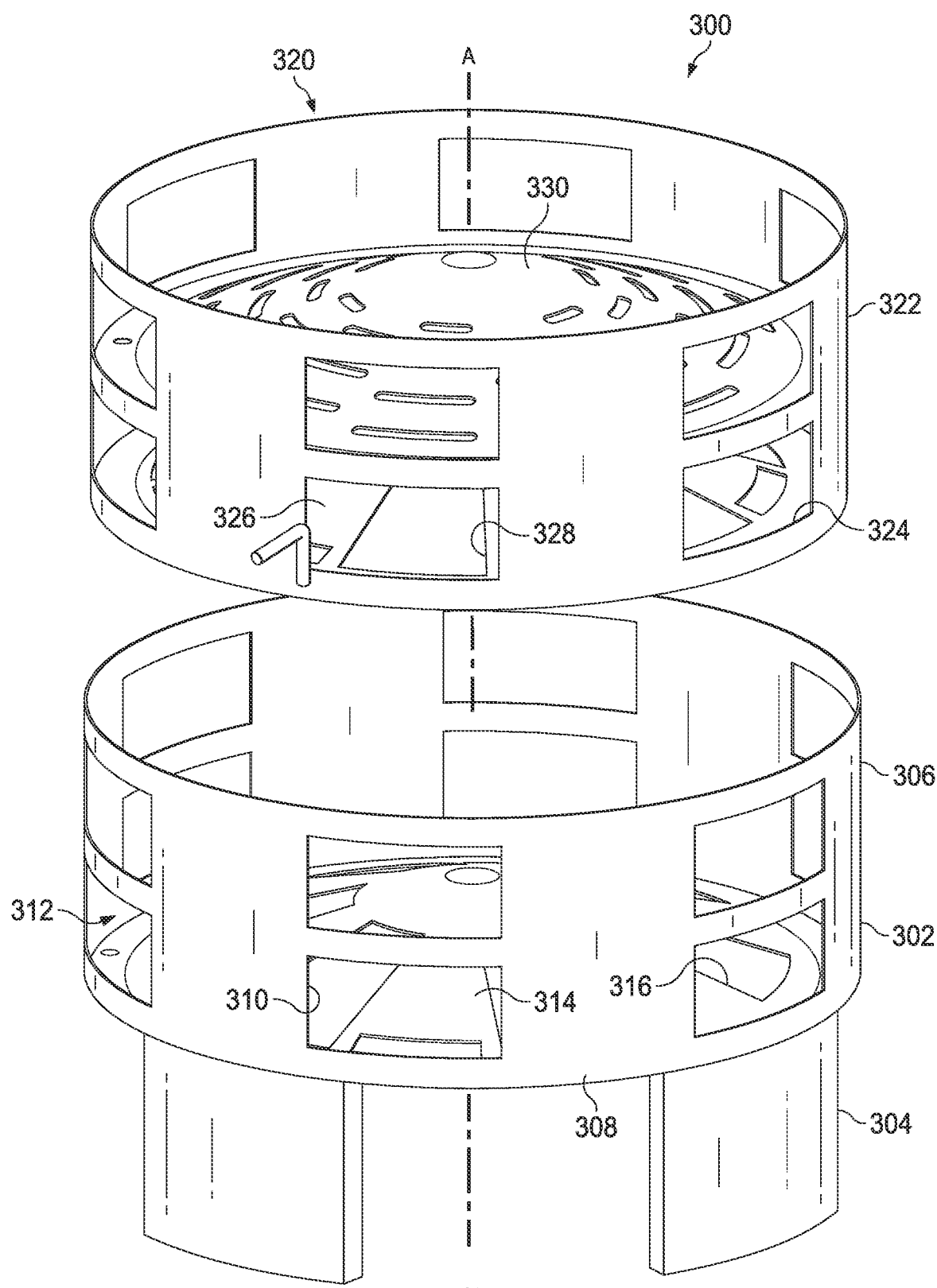
FIG. 2 is an exploded perspective view of a baffle structure according to aspects of the present disclosure.

Referring now to FIG. 2, an exploded perspective view of the baffle structure 300 according to aspects of the present disclosure is shown. The baffle 300 structure is shown "exploded" for illustrative purposes. A lower portion 302 may receive a cooperating upper portion 320 when the components are assembled for operation. To adjust operation of the baffle structure 300, the upper portion 320 may be rotated with respect to the lower portion 302. The rotation may be with respect to a central vertical axis A. Thus, the lower portion 302 and upper portion 320 may be considered to be axially concentric (e.g., with respect to axis A). In some embodiments, a fastener attaches lower portion 302 to upper portion 320 in such a way that ability to rotate about axis A is preserved.

In some embodiments, the lower portion 302 may be placed in a stationary position within the firebox 102. A support structure 304 may be provided to situate the lower portion 302 properly above the firepot 204. As illustrated, support structure 304 comprises legs that may be tall enough and spaced apart sufficiently to pass the auger and ventilation mechanism through to the firepot 204. The baffle structure 300 may also be aligned coaxially to the firepot 204.

The lower portion 302 may comprise a cylindrical wall 306 having a number of openings 310 defined in an otherwise closed portion 308. The closed portion 308 of the wall 306 is configured to be solid or impermeable such that gases cannot pass therethrough. Thus, gases and combustion products must pass through openings 310 to pass through the cylindrical wall 306. As shown, openings 310 may be multi-leveled or multi-tiered. In other embodiments, the openings 310 might be placed only on the upper half (or lower half) of the cylindrical wall 306 or any positioning in another configuration or manner. Openings 310 may be confined to a certain percentage of the circumference of the wall 306. For example, openings 310 may occupy 30%, 50%, or 60% of the circumference of the wall 306, even if some openings are "stacked" as shown. Moreover, the openings 310 may be distributed uniformly or non-uniformly. The illustrated multi-level opening 310 may be sorted in vertical columns as shown in FIG. 2, or they may form a staggered or checkerboard pattern, or may comprise a combination of patterns possibly including multiple vertical/horizontal alignments.

Near a bottom or lower edge of the wall 306 may be a plate or domed baffle 314, which further has a solid portion 314 interrupted by various openings 316. Again, the openings 316 may be restricted to a certain percentage of the total area of the baffle 314 (e.g., 30%, 50%, 60%).

In the illustrated embodiment, the upper portion 320 nests and sits within the lower portion 302. The upper portion 320 may comprise a cylindrical peripheral wall 322 that sits near to or in contact with the lower cylindrical wall 306 when the baffle structure 300 is assembled. In some embodiments, the upper portion 320 rests upon the baffle 324 inside the lower portion 302.

The wall 322 of the upper portion 320 defines a number of openings 324 that may be stacked vertically, as shown, but which may only occupy a portion of the total circumference of periphery of the wall 322. The sizes and locations of the openings 324 may be made to correspond to the sizes and locations of the openings 310 in the lower wall 306 such that the openings may be aligned to allow gases therethrough. In some embodiments, the openings 310 are substantially identical in location and size to the openings 324. In some embodiments, the openings 310, 324 may be made to occupy less than half of the periphery of the respective wall 306, 322 such that by appropriate rotation of the upper portion 320 relative to the lower portion 302, passage of gases therethrough (both walls 306, 322) may be substantially or completely blocked. In further embodiments, the openings on the walls 306, 322 may be of a "checkerboard" appearance such that there is some opening on every, or almost every, perimeter portion of the walls 306, 322 but they may still be rotated to open or closed positions.

The upper portion 320 may also provide a lower baffle 326 providing openings 328 that may be configured and located to cooperate with openings 316 in the baffle 314 of the lower portion 302. Thus, the baffles 326, 314 may also cooperate to allow flow of gases and combustion products, or substantially impede them.

The upper portion 320 may also provide a mid baffle 330 along some vertically medial portion thereof. The mid baffle 330 may help to ensure that rising heat and combustion products are evenly spread over the high temperature cooking zone 302 even with the upper portion 320 and lower portion 302 are rotated such that heated gases and combustion products pass through. The mid baffle 330 may be removable from the upper portion 320 for cleaning or other purposes.

In some embodiments, the locations of the holes 310, 324 defined in the walls 306, 322 may be offset from the respective holes 316, 328 in the baffles 314, 326. Thus, in operation, when the baffles 314, 326 are configured to admit and pass the maximum amount of heat, gas, and other combustion products, the same are retained to a maximum degree by the walls 306, 322 and delivered upwardly (possibly through baffle 330) to the high temperature cooking zone 203 of the cooking grate 202. Such a configuration may be useful for high temperature cooking operations. On the other hand, when the baffles 312, 326 are rotated to reduce the amount of heat, gas, and other combustion products into the baffle structure 300, the walls 306, 322 may be configured to allow more, or a maximum amount, of throughflow. Such a configuration will tend to spread heat, smoke, and other combustion products to the entire cooking grate 202. This may be useful for lower temperature cooking operations. In such case, the entire cooking grate 202 may have a similar or substantially similar cooking temperature such that the high temperature cooking zone 203 may be used in a similar manner as the remainder of the cooking grate 202.

It should also be appreciated that by adjusting the locations of holes 310, 324 in the walls 306, 322 relative to holes 316, 328 in the baffles 312, 326 various other configurations may be selectively achievable by rotation of the upper portion 320 relative to the lower portion 302. For example, passages through walls 306, 322 may be closed or open while baffle openings may be partially open, or vice versa. It is also possible to arrange holes 310, 324 in the walls 306, 322 relative to holes 316, 328 in the baffles 312, 326 such that passageways through both walls and baffles may be simultaneously selectively partially open.

It will be appreciated that in some respects the upper portion 320 and lower portion 302 are combined to form a single baffle structure having a floor that is openable and closeable (comprising baffles 326, 314). Similarly, a sidewall is formed (comprising walls 306, 322) that is also openable and closeable. Again, the upper portion 320 and lower portion 302 may be configured such that the floor or the sidewall is open but not both together. Such operation might be termed "selective" as a user can select which openings to utilize. It should also be understood that when a floor or sidewall is "closed" that it is not necessarily completely sealed against all gas seepage. Rather, there is no overlap between the openings in the floors 326, 314 or the walls 306, 322 as the case may be. In such case, the respective openings would be considered "closed". It may also be said that there is no straight, non-impeded, or non-tortured path for gases or fluids to pass through.

Thus, according to various embodiments of the present disclosure, a circular baffle structure 300 may be provided and placed generally over and around the open top of a firepot 204. This structure 300 may comprise two concentric, generally cylindrical structures (e.g., upper portion 320 and lower portion 302) that can be rotated with respect to each other to open or close various matching openings to alter the flow of hot gas out of the firepot 204 to the cooking grate 202. The escaping gases may thus be either spread toward the extremities of the total cooking grate area or concentrated it in a central grilling zone 203 on the grate 202, over the firepot 204.

In various embodiments of the present disclosure, a simple and effective way to vary the thermal intensity of the pellet appliance from a low thermal intensity over a large area to a high thermal intensity over a smaller area is provided. Among the non-limiting and non-exclusive distinguishing features of various embodiments are the symmetrical cylindrical construction that vents gas out of the sides of the cylindrical baffle structure 300 as well as the top thus spreading hot gas more effectively when the larger area is being heated. On the other hand, gases may be substantially or completely contained to vertical movement out of the top of the cylinder when the smaller area is being heated. In addition, the system of overlapping openings (e.g., 310 and 324 and/or 316 and 328) allows fine tuning of the relative effects as well as the large effect given by full change from one configuration to another.

It should be appreciated that the lower portion 302 and upper portion 322 could be inverted such that the baffles 326, 314 are nearer the cooking grate than the fire pot 204. In such case, the mid baffle 330 may or may not be present, or may be located elsewhere.

Figure 3:
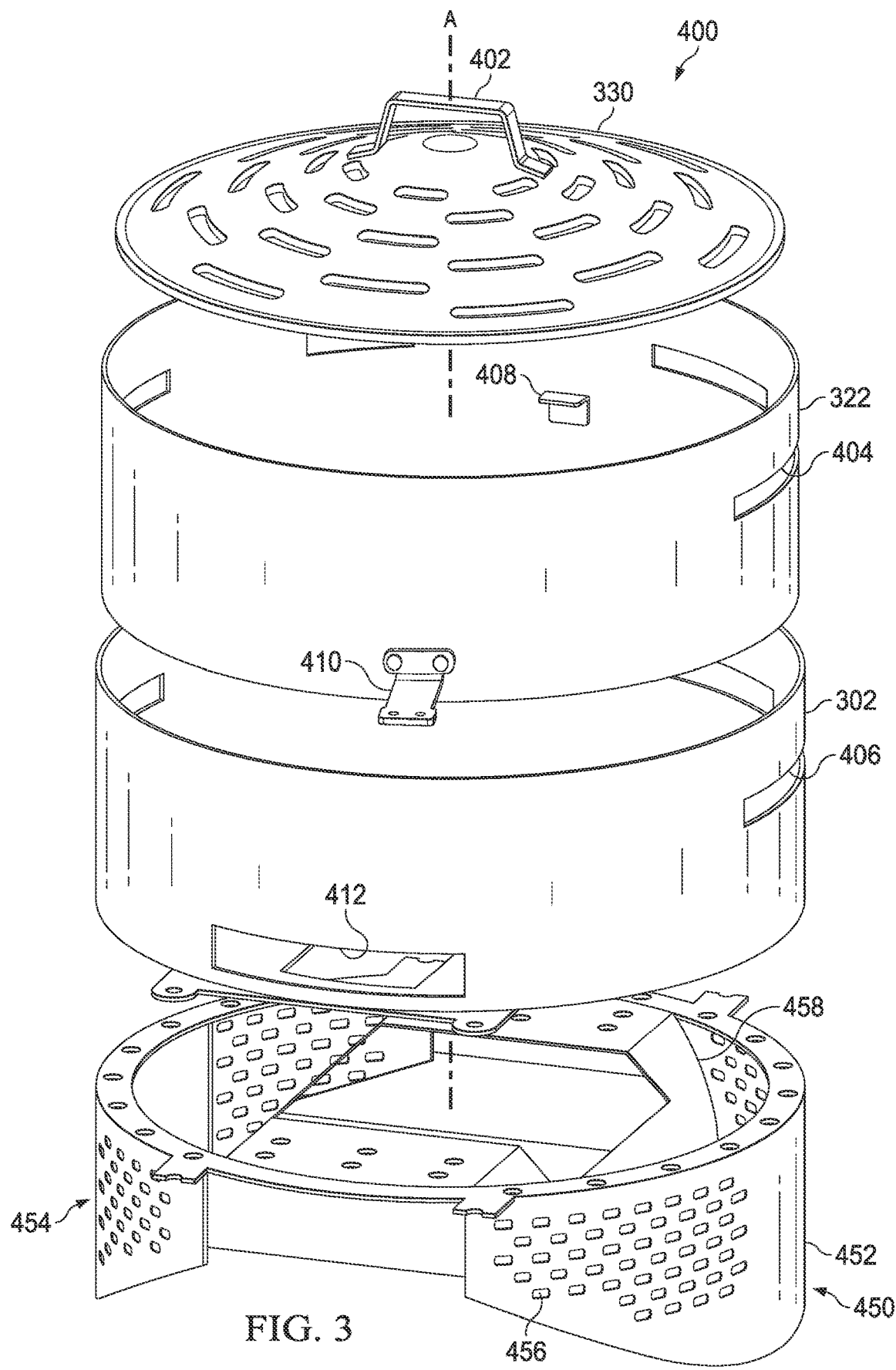
FIG. 3 is an exploded perspective view of another baffle structure according to aspects of the present disclosure.

Referring now to FIG. 3, an exploded perspective view of another baffle structure 400 according to aspects of the present disclosure is shown. The baffle structure 400 may be used and function similarly to baffle structure 300, and the two components have some commonality of parts and construction. The baffle structure 400 has an upper portion 322 that nests into a lower portion 302 such that the components are rotatable relative to one another about axis A. The upper portion 322 may or may not be affixed to lower portion 302 with a rotatable fastener (not shown). Holes or openings 404, 406 are defined within the walls of upper and lower portions 322, 302, respectively. Such holes 404, 406 are more limited in number and area than those illustrated in FIG. 3, but the principle of operation is similar.

Interior baffles (e.g., 314, 326 of FIG. 6) are also contained within upper portion 322 and lower portion 302 and cooperate to create an adjustable floor inside the baffle structure 400 allowing more or less combustion gas and heat from the fire pot 402 into the baffle structure 400. Again, the upper portion 322 and lower portion 302 may be configured with baffles and openings such that the upper and lower portions 322, 302, respectively may be rotated relative to one another such that gas flow is substantially unimpeded from below (e.g., through baffles 314, 326) but halted or limited through openings 404, 406, or vice versa. In some embodiments, baffles 314, 326 are open while the openings 404, 406 are also open. Fine tuning of the gas flow through baffles 314, 326 and openings 404, 406 may be accomplished by partial rotation of the upper portion 322 relative to lower portion 302.

The baffle structure 400 may also be adjustable remotely. A lever 410 affixed to upper portion 322 may be provided that is movable within a cooperating slot 412 defined in the lower portion 302. The lever and slot may be sized such that movement of the lever 410 entirely in one direction opens baffles 314, 326 and closes holes 404, 406 while movement entirely in an opposite direction closes baffles 314, 326 and opens holes 404, 406. Movement of the lever 410 to a medial area of the slot 412 may result in partial opening of the baffles 314, 326 and the holes 404, 406.

The upper portion 322 once again contains a mid baffle 330 that may be situated medially (elevationally) within the baffle structure 400. In some embodiments the mid baffle 330 is nearer the baffle 326 or nearer the food grate 202. The mid baffle 330 may be situated above or below openings 404, or with some openings above and some below the mid baffle. The baffle structure 400 provides one or more supports 408 at predetermined locations inside, and possibly affixed to, the upper portion 322 for locating and resting the mid baffle 330. The mid baffle 330 may be removable for different cooking configurations, for cleaning, etc. A handle 402 may be provided on the mid baffle.

The baffle structure 400 also provides a support structure 450 of a different configuration that that shown for baffle structure 300 (FIG. 3). Here the support structure 450 is generally cylindrical and provides side panels 450 interrupted by openings 454. The side panels 450 may vary in number and size (in concert with the openings 454) and may define screened areas or openings 456 within the panels 452 to further fine tune air and gas flow.

A bracket 458 may affix to the support structure 450, possibly centered therein, and be sized to cooperate with the fire pot 204 to properly centrally locate support structure 450 and baffle structure 400 over the fire pot 402 and in the proper location below cooking grate 202.

Figure 4:
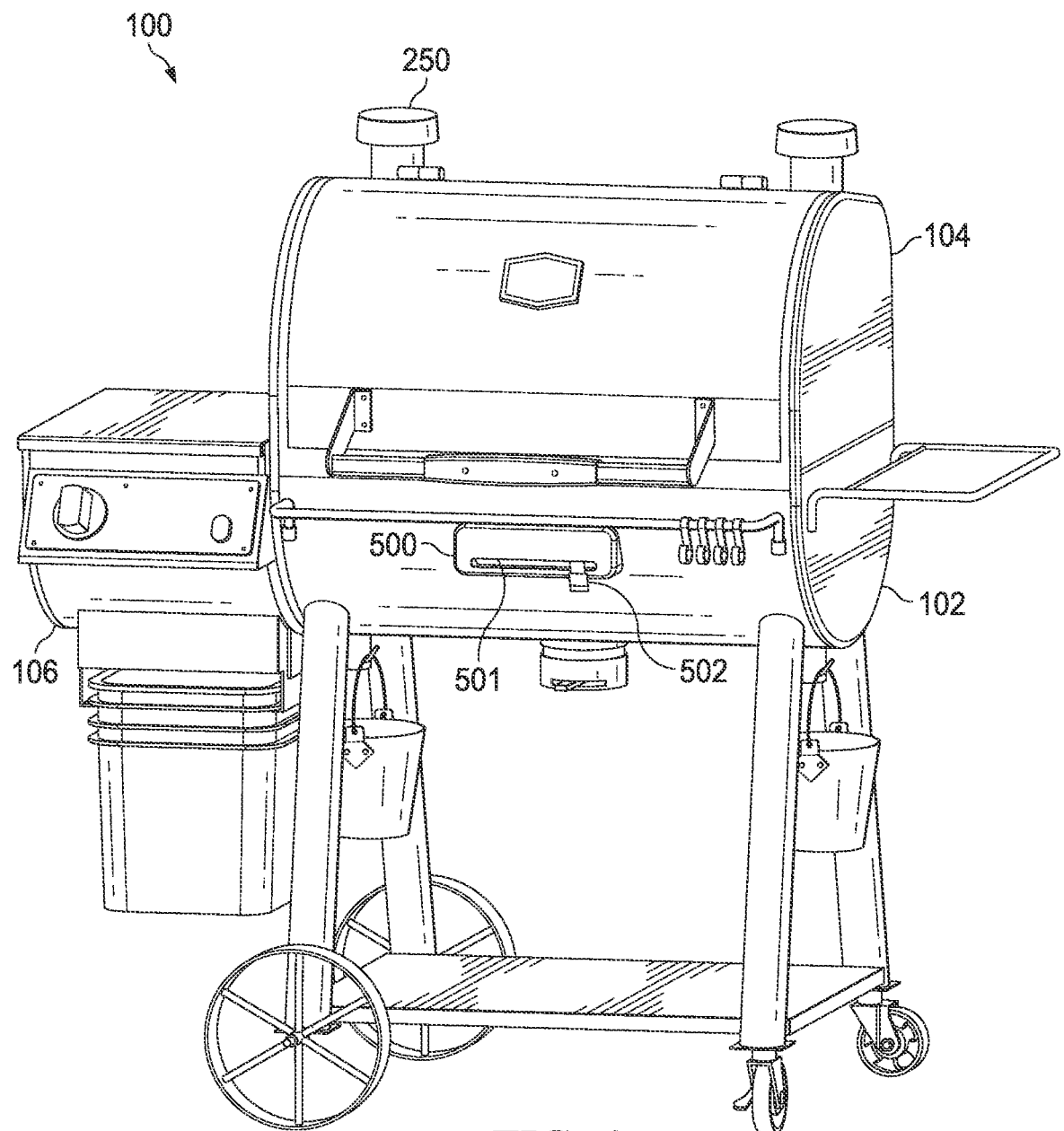
FIG. 4 is a front perspective view of a smoker according to aspects of the present disclosure.

Referring now to FIG. 4 a front perspective view of the smoker 100 according to aspects of the present disclosure is shown. Here, particularly where the baffle structure 400 as shown in FIG. 4 is used, the smoker 100 may have an external adjustment panel 500 for operation or adjustment of the baffle structure 400 while it is inside the smoker without the need to open the lid 104 and/or move the cooking grate 202. The panel may provide a slot 501 through which the lever 410 passes when the baffle structure 400 is in place. A separate handle 502 may also be provided that joins to the lever 410 outside and/or inside the smoker 100. The handle 502 may extend the lever 410 to a convenient location and/or serve to insulate the lever 510 where it may be touched by a user of the smoker 100.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A cooking appliance comprising,
    a cooking grate supported over a fire box having a firepot contained therein that burns solid pelletized fuel fed from an auger running from outside the firebox; and
    a baffle structure arranged above the firepot and having an upper component nested coaxially within lower component with the upper and lower components rotatable with respect to one another;
    wherein the upper component has a floor defining a first plurality of floor openings therein, the first plurality of openings being arranged in first predetermined pattern on the floor of the upper component;
    wherein the lower component has a floor defining a second plurality of floor openings therein, the second plurality of openings being arranged in second predetermined pattern on the floor of the lower component; and
    wherein the upper component floor rests in contact with the lower component floor and the first and second predetermined patterns of the respective floor openings defined in the respective floors are arranged such that overlap of the first and second plurality of openings may be selected, deselected, or partially selected by rotation of the upper component relative to the lower component;
    wherein the upper and lower components further comprise upper and lower upright sidewalls, respectively, joining the respective floors;
    wherein the upper and lower upright sidewalls define a plurality of upper sidewall openings and a plurality of lower sidewall openings respectively;
    wherein the upper upright sidewall openings and the lower upright sidewall openings have a configuration such that overlap between the first plurality of upright sidewall openings and the second plurality of upright sidewall openings may be selected, deselected, or partially selected by rotation of the upper component relative to the lower component;
    wherein the overlap between the first and second plurality of floor openings is partially selected when the overlap in the between the first and second plurality of upright sidewall openings is not selected; and
    wherein the overlap between the first and second plurality of floor openings is not selected when the overlap in the between the first and second plurality of upright sidewall openings is partially selected.

2. The cooking appliance of claim 1, wherein the upper component further comprises a removable mid baffle spaced apart from the upper component floor.

3. The cooking appliance of claim 2, further comprising support structure supporting the baffle structure over the firepot.

4. The cooking appliance of claim 2, wherein the baffle structure interposes the firepot and the cooking grate and defines a high temperature zone on the cooking grate that is active when the overlap between the first and second plurality of floor openings is selected.

* * * * *